Sept. 29, 1964 P. J. PYKE 3,151,221

GRAMOPHONE PICK-UPS

Filed June 3, 1960

Inventor
P. J. Pyke
By Glascock Downing Seebold
Attys.

United States Patent Office 3,151,221
Patented Sept. 29, 1964

3,151,221
GRAMOPHONE PICK-UPS

Peter John Pyke, Hounslow, England, assignor to Electric & Musical Industries Limited, Hayes, England, a company of Great Britain Filed June 3, 1960, Ser. No. 33,771
Claims priority, application Great Britain June 13, 1959
1 Claim. (Cl. 179—100.41)

Figures 1, 2, 3, 4, 5, 6, 7:
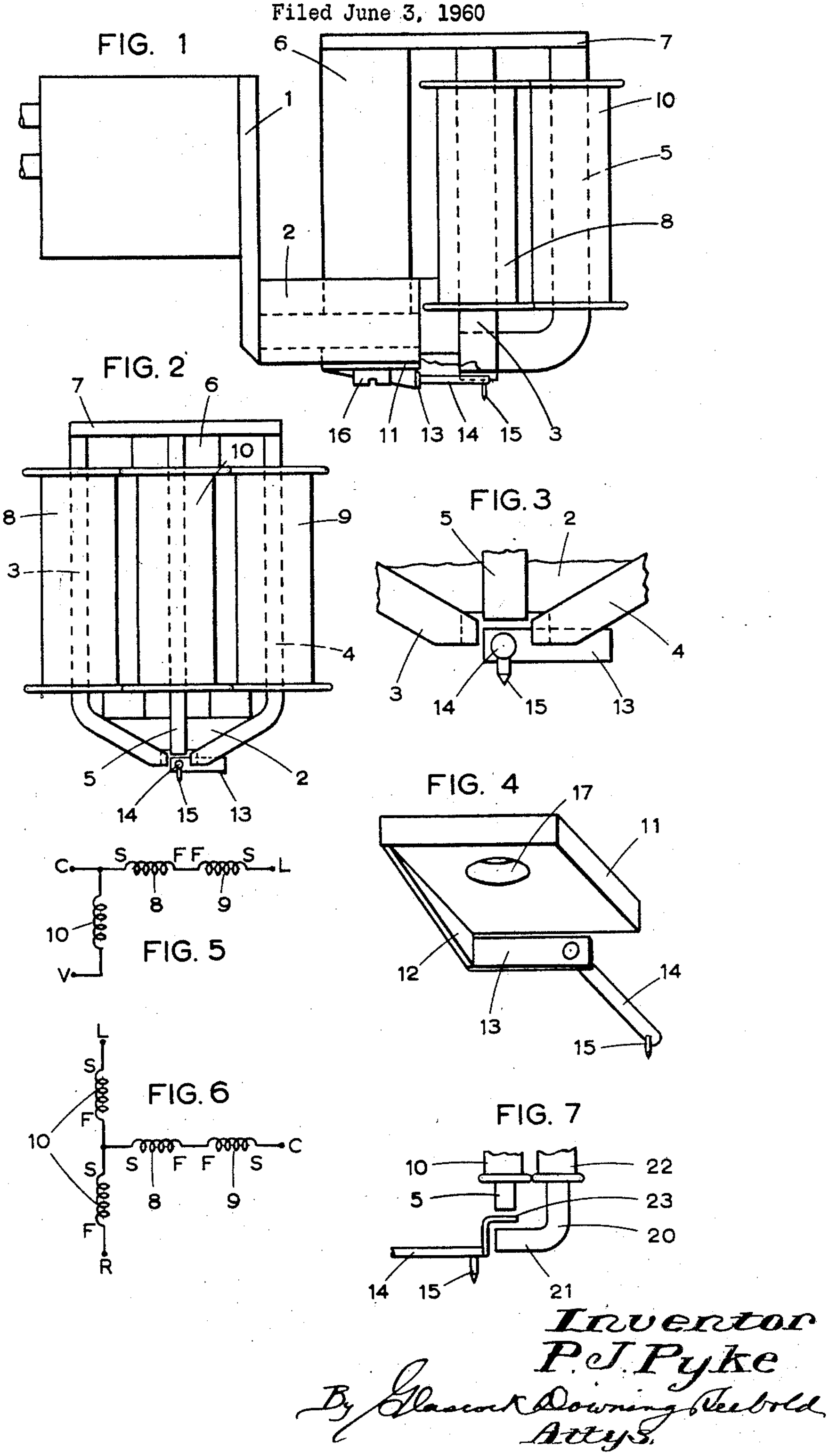

This invention relates to gramophone record pick-ups and has particular but not exclusive reference to pick-ups of the kind designed for use in the reproduction of so-called complex cut gramophone records.

In a complex cut record two separate sets of signals are recorded in a single groove as complex modulations thereof, one set of signals for example being in the form of a lateral cut and the other set of signals in the form of a hill-and-dale cut, so that the two directions of groove modulation are substantially perpendicular to each other. Alternatively the two directions of groove modulation whilst still being substantially perpendicular to each other, may each be disposed at 45° to the plane of the record. Such a type of record is currently used for the stereophonic reproduction of sound.

A pick-up essentially comprises a stylus arm adapted to carry a stylus and means whereby vibrations of said arm imparted thereto when the stylus tracks a modulated record groove are converted into electrical signals. The stylus arm is frequently of cantilever form and for the reproduction of long playing records the stylus is usually made of sapphire or diamond. One of the difficulties encountered in the construction of pick-ups is in the mounting of the cantilever stylus arm and the object of the present invention is to provide an improved form of mounting.

According to the invention there is provided a gramophone record pick-up comprising a cantilever stylus arm which is torsionally stiff, and a member substantially fixed at one region thereof and on which said stylus arm is mounted at a point displaced from said region the arrangement being such that said member restrains torsional movement of said arm and when said arm moves in one direction said member undergoes substantially only torsional movement whereas when said arm moves in a direction substantially at right angles to said one direction said member undergoes substantially only a bending movement.

The improved form of mounting for said stylus arm can be applied to any suitable type of pick-up such as a moving iron or crystal pick-up but is particularly applicable to a variable reluctance pick-up. In this latter case the stylus arm is made of magnetic material and pole pieces are provided between which and the stylus arm a magnetic field can be set up and coils are provided associated with said pole pieces, the stylus arm being adjacent to said pole pieces so as to function as an armature so as to produce reluctance variations as said armature vibrates and so causes the induction of voltages in said coils. Said member on which the stylus arm is mounted may comprise a spring, preferably of flat or leaf form.

By virtue of the fact that said member undergoes substantially only torsional movement when said stylus arm moves in one direction, and substantially only a bending movement when said stylus arm moves at right angles to said one direction, the pick-up is eminently suitable for use as a pick-up for complex cut records, and in the case of a variable reluctance pick-up a suitable number of pole pieces and coils will be provided whereby outputs can be obtained representative of the two different directions of groove modulation. The invention, however, is not limited in its use to pick-ups designed for reproducing complex cut records since the invention can be applied to pick-ups designed solely as monaural pick-ups in which the modulations of the record groove will only cause said member to undergo one type of movement. Such a pick-up will, however, be capable of reproducing monaurally from a complex cut record.

In order that the said invention may be clearly understood and readily carried into effect, it will now be more fully described with reference to the accompanying drawings, in which:

FIGURE 1 is a side elevation of a pick-up in accordance with one embodiment of the invention, FIGURE 2 is an elevation looking towards the right-hand end of FIGURE 1, FIGURE 3 is an enlarged view of a portion of the pick-up as shown in FIGURE 2, FIGURE 4 is an enlarged rear perspective view of the stylus arm and pick-up shown in FIGURES 1 and 2, FIGURES 5 and 6 show different ways of connecting coils employed in the pick-up shown in FIGURES 1 and 2, and FIGURE 7 illustrates a modification of the pick-up shown in FIGURES 1 and 2.

The invention is shown in the drawings as applied to a pick-up of the variable reluctance type for reproducing complex cut records.

The pick-up shown in FIGURES 1 to 4 of the drawings comprises a supporting arm 1 preferably made of non-magnetic material by means of which the pick-up can be supported in a suitable housing (not shown), and arm 1 carrying at its lower end a forwardly extending support 2 made of non-magnetic material such as brass. The forward end of the support 2 is shaped as will be observed from FIGURES 2 and 3 so as to provide two inclined surfaces to which are secured as by soldering a pair of outer pole pieces 3 and 4, the lower pole ends of which are bent inwardly and secured to the inclined surfaces of said support 2 so as to form two outer pole ends whilst the upper portions of the pole pieces extend substantially parallel to one another as shown. A centre pole piece 5 is provided, this pole piece also having an upper portion arranged substantially parallel to the upper portions of the pole pieces 3 and 4 whilst the lower pole end of the pole piece 5 is bent inwardly and is soldered into a slot formed in the support 2. The pole end of the pole piece 5 is disposed substantially centrally between and above the pole ends of the pole pieces 3 and 4. The pole pieces may be formed of any suitable material such as high permeability magnetisable material. The lower ends of the pole pieces 3, 4 and 5 are disposed in juxtaposition as shown in FIGURES 2 and 3 and are spaced to form an air gap. Also supported by the support 2 is a permanent magnet 6 which may be mounted at its lower end in a recess in the support 2, the magnet 6 being preferably of square cross-section with the upper end thereof lying in a plane containing the upper ends of the pole pieces 3, 4 and 5, the upper ends of the magnet and pole pieces being bridged by a plate 7 of magnetic material such as annealed mild steel. The upper portions of the pole pieces 3, 4 and 5 are surrounded by coils 8, 9 and 10 respectively. Supported in a recess in the undersurface of the support 2 is a mild steel plate 11 having at one side a downwardly turned edge 12 to which is attached as by soldering a member in the form of a flat spring 13, which may or may not be formed of magnetic material, to which is secured as by soldering a cantilever armature or stylus arm 14 in the form of a tube which is relatively torsionally stiff and which is made of magnetic material such as mild steel. The armature or arm 14 carries at its outer end a stylus 15 such as a diamond stylus. The plate 11 is secured in the recess in the lower surface of the support 2 by means of a screw 16 passing through a hole 17 and threaded into the support 2. The armature or stylus arm 14 projects into the air gap formed between the juxtaposed ends of the pole pieces 3, 4 and 5 as shown in FIGURES 2 and 3. Due to the manner of mounting the armature or arm 14, it will be appreciated that when the arm is caused to move in a vertical direction the member 13 undergoes substantially only a torsional movement whereas when the arm 14 moves in a horizontal direction the member undergoes substantially only a bending movement.

In the arrangement described, three magnetic circuits are provided. The first circuit (i) includes the magnet 6, a portion of the plate 7, the pole piece 3, the armature or arm 14, the spring 13 if made of magnetic material and the plate 11, this circuit, which also includes the air gap between the armature or arm 14 and the end of the pole piece 3, having coupled thereto the coil 8. The second circuit (ii) is similar except that it includes the pole piece 4 instead of the pole piece 3, and the air gap between the armature or arm 14 and the end of the pole piece 4, and it has coupled thereto the coil 9. The third circuit (iii) is also similar in that it includes the magnet 6, a portion of the plate 7, the pole piece 5, the air gap between the pole piece 5 and the armature or arm 14, the armature or arm 14, the spring 13 if made of magnetic material and the plate 11, this third circuit having coupled thereto the coil 10. The magnet 6 sets up a magnetic flux in the three magnetic circuits and hence across the respective air gaps, and it will be appreciated that when the pick-up is in engagement with a complex cut record the lateral modulations will cause the armature or arm 14 to move in a horizontal plane between the pole pieces 3 and 4 so varying the reluctances of the circuits (i) and (ii) in opposite senses and causing corresponding voltages to be induced in the coils 8 and 9. Likewise as a result of a vertical modulation in the complex record the armature or arm 14 will move in a vertical plane relatively to the pole piece 5 and cause a variation in the reluctance of the magnetic circuit (iii) so that a corresponding voltage will be induced in the coil 10.

The above-described pick-up is suitable for reproducing a complex cut gramophone record comprising two sets of signals recorded as lateral modulations and vertical modulations respectively. When the pick-up is for use with such a type of record the coils 8, 9 and 10 can be connected together as shown in FIGURE 5. The start and finish of the coils 8 and 9 are indicated by the letters S and F and these two coils are wound in the same sense and are connected in series opposition so that the voltages induced in the coils are aiding. Each of the coils 8 and 9 may comprise 2,160 turns of 47 SWG. The coil 10 is a single coil of 3,240 turns of 49 SWG. The junction between the coil 10 and the coil 8 constitutes a common output terminal and voltages representing lateral modulations can be derived from the terminal L and the terminal C and voltages representing vertical modulations can be derived from the terminal V and the terminal C. The turns of the respective coils are chosen so that when the armature or arm 14 moves by a predetermined amount from some point towards one or other of the pole pieces 3 and 4 the voltage induced in the windings 8 and 9 is substantially the same as that induced in the winding 10 when the armature or arm 14 moves towards the pole piece 5 from said point by substantially the same amount.

Present complex cut stereophonic disc records have the two directions of modulation each disposed at 45° to the plane of a record and in order that the pick-up shown in the drawings be suitable for reproducing the modulation in such records the coil 10 associated with the pole piece 5 may be wound with two insulated wires so as to provide two windings affording two substantially equal outputs for vertical modulation whilst the coils 8 and 9 are wound to give substantially equal outputs for the lateral modulation, the coils 8 and 9 being connected in opposition so as to afford a single output for lateral modulations. The respective number of turns on the coils 8, 9 and 10 are so chosen that when the stylus is driven at 45° to the record surface the output from the coils 8 and 9 when connected in opposition, is substantially equal to each of the outputs from the two windings of the coil 10. To obtain the necessary left and right-hand outputs as is required for stereophonic reproduction one of the two separate windings of the coil 10 is connected as shown in FIGURE 6 in series in one sense with the coils 8 and 9, whilst the other of the two separate windings of the coil 10 is connected in series in the opposite sense with the coils 8 and 9 so as to afford sum and difference outputs. The terminal C again constitutes a common terminal and a left-hand output is obtained from the terminals L and C and a right-hand output from the terminals R and C. Preferably the two windings 10 are in the form of a centre tapped single winding and to provide a high impedance output pick-up the two coils 8 and 9 may each comprise 2,160 turns of 47 SWG and the winding 10 may comprise 6,480 turns of 49 SWG which as aforesaid in centre tapped.

The dimensions of a typical pick-up in accordance with the invention may be such that the lower end of the pole piece 5 is approximately 0.012" above the end of the armature or arm 14 carrying the stylus whilst the gap between the ends of the pole pieces 3 and 4 is 0.050". The bar magnet may be 3/16" square, the steel tube forming the armature or arm 14 may be 0.020" in external diameter and 0.014" in internal diameter and 0.160" long. The diamond stylus 15 may have a square shank of 0.010" with a conical end having a tip radius of 0.0005". The spring 13 may be 0.030" wide, 0.160" long and 0.0025" thick. The plate 11 may be 1/32" thick and 3/16" square. If desired a piece of polyiso-butylene or other suitable material may be applied around the spring 13 and the adjacent end of the armature 14 in order to provide a small degree of damping.

Whilst it is preferred to employ the three pole pieces described above a fourth pole piece may, if desired, be employed as shown in FIGURE 7, such forth pole piece 20 co-operating with the pole piece 5 for the purpose of transducing the vertical modulations. The fourth pole piece 20 may be mounted in front of the pole piece 5 and is provided with a laterally extending portion 21 which extends beneath the end of the pole piece 5, the upwardly extending portion of the pole piece 20 being parallel to the upwardly extending portions of the pole pieces 3, 4 and 5 and is surrounded by a coil 22. The stylus end of the armature or arm 14 may be provided with a right-angled extension 23 which is disposed in the air gap formed between the adjacent ends of the pole pieces 5 and 20 and between the adjacent ends of the pole pieces 3 and 4. Where the fourth pole piece 20 is employed each of the coils 10 and 22 will have fewer turns compared with the number of turns of the coil 10 when only the pole piece 5 is employed and the coils 10 and 22 will be connected in series opposition so that induced voltages are aiding, the number of turns being chosen so that substantially the same output is derived from the coils 10 and 22 when the extension 23 moves from some predetermined point a predetermined amount towards the pole piece 5 or 21 as when the extension 23 moves from the same point by substantially the same amount towards the pole piece 3 or 4.

As stated above the manner of mounting the stylus arm 14 on the member 13 is not limited in its application to a variable reluctance pick-up since it can be applied to other types of pick-up. For example, the member 13 may comprise a piezo-electric crystal which when the pick-up is designed for the reproduction of a complex cut record may for example be a combined bender and twister crystal structure so that suitable outputs are provided when the crystal bends and when the crystal is twisted under the action of the stylus arm 14. If desired the crystal structure may be mounted on the spring 13.

What I claim is:

A gramophone pick-up for the reproduction of sound recorded on a complex-cut record in which the respective stereophonic signals are respectively recorded on the record in two mutually perpendicular directions comprising means for setting up a magnetic field, three pole pieces coupled to said means and having pole ends disposed in juxtaposition, said pole pieces being so arranged as to provide two outer pole ends and a third pole end disposed substantially centrally between and above said two outer ends, a supporting body, a flat spring member one end of which is attached to said supporting body and the other end of which is unsupported, a cantilever stylus arm rigidly attached to said spring member adjacent the unsupported end thereof, said stylus arm carrying adjacent the other end thereof a stylus which projects transversely of the arm, said stylus arm being torsionally stiff and being restrained by said spring member from undergoing rotational movement and being angularly moveable in any plane containing its longitudinal axis, such movement in a first plane being permitted by simple bending of said flat spring member and such movement perpendicular to said first plane being permitted by twisting of said flat spring member, such stylus arm being made of magnetisable material and the end thereof adjacent said stylus extending into the gap defined by said pole ends so that said angular movement of said stylus arm produces reluctance variations in the magnetic circuits comprising said respective pole pieces, wherein in response to said signals recorded in one of said directions and stylus transmits movement to angularly move said stylus arm in the first plane and in response to said signals recorded in the other of said directions said stylus transmits movement to angularly move said stylus arm in said other plane, and windings coupled with said pole pieces the number of turns of each of said windings being so chosen that, when the stylus arm moves from a predetermined point by a predetermined amount towards one or the other of said two outer pole ends, the voltage induced in the windings respectively coupled with said two outer pole pieces is substantially the same as that induced in the windings coupled with the third pole piece when the stylus arm moves from said point towards said third pole piece by substantially the same amount, and means responsive to the movement of said stylus arm in the respective planes for producing signals suitable for stereophonic reproduction.

References Cited in the file of this patent

UNITED STATES PATENTS

| | | |
|---|---|---|
| 2,868,892 | Kerbane | Jan. 13, 1959 |
| 2,875,282 | Reiback | Feb. 24, 1959 |
| 2,879,413 | Smith-Johannsen | Mar. 24, 1959 |
| 3,067,295 | Stanton | Dec. 4, 1962 |